United States Patent

Eltoukhy et al.

[11] Patent Number: 5,167,096
[45] Date of Patent: Dec. 1, 1992

[54] METHOD FOR TEXTURING A MAGNETIC DISC SUBSTRATE

[75] Inventors: Atef Eltoukhy, Saratoga; Yassin Mehmandoust, Berkeley; Shiro Murakami, Fremont, all of Calif.

[73] Assignee: HMT Technology Corporation, Fremont, Calif.

[21] Appl. No.: 485,278

[22] Filed: Feb. 26, 1990

[51] Int. Cl.$^5$ .............................. B24B 1/00; G11B 5/84
[52] U.S. Cl. ............................ 51/281 SF; 51/328
[58] Field of Search ............... 51/281 R, 218 SF, 317,
51/318, 326–328, 395, 396, 398, 401, 402, 129,
131.1, 131.3, 131.4, 132, DIG. 6, DIG. 34, 117,
118; 427/129, 130

[56] References Cited

U.S. PATENT DOCUMENTS

| 3,499,250 | 3/1970 | Jensen et al. | 51/401 |
|---|---|---|---|
| 4,179,852 | 12/1979 | Barnett | 51/132 |
| 4,393,628 | 7/1983 | Ottman et al. | |
| 4,466,218 | 8/1984 | Ottman et al. | |
| 4,525,957 | 7/1985 | Daniels | 51/131.1 X |
| 4,557,947 | 12/1985 | Deimling et al. | 427/130 |
| 4,735,840 | 4/1988 | Hedgcoth | |
| 4,835,909 | 6/1989 | Richter et al. | 51/326 X |
| 4,894,133 | 1/1990 | Hedgcoth | |
| 4,939,614 | 7/1990 | Shirakura et al. | |

FOREIGN PATENT DOCUMENTS

| 0144654 | 9/1982 | Japan | 51/118 |
|---|---|---|---|
| 2031326 | 2/1990 | Japan | 51/281 SF |

*Primary Examiner*—Bruce M. Kisliuk
*Assistant Examiner*—John A. Marlott
*Attorney, Agent, or Firm*—Peter J. Dehlinger

[57] ABSTRACT

Method and apparatus for texturing a substrate for use in a magnetic recording disc. A texturing pad used in the invention has inner and outer coaxial regions, with the outer region being more compressible. When the pad and a substrate are rotated about parallel, offset axes, and pressed against one another in the presence of a particle slurry, the inner, less compressible region of the pad produces a deeper-groove texturing on an inner annular surface region of the disc.

8 Claims, 3 Drawing Sheets

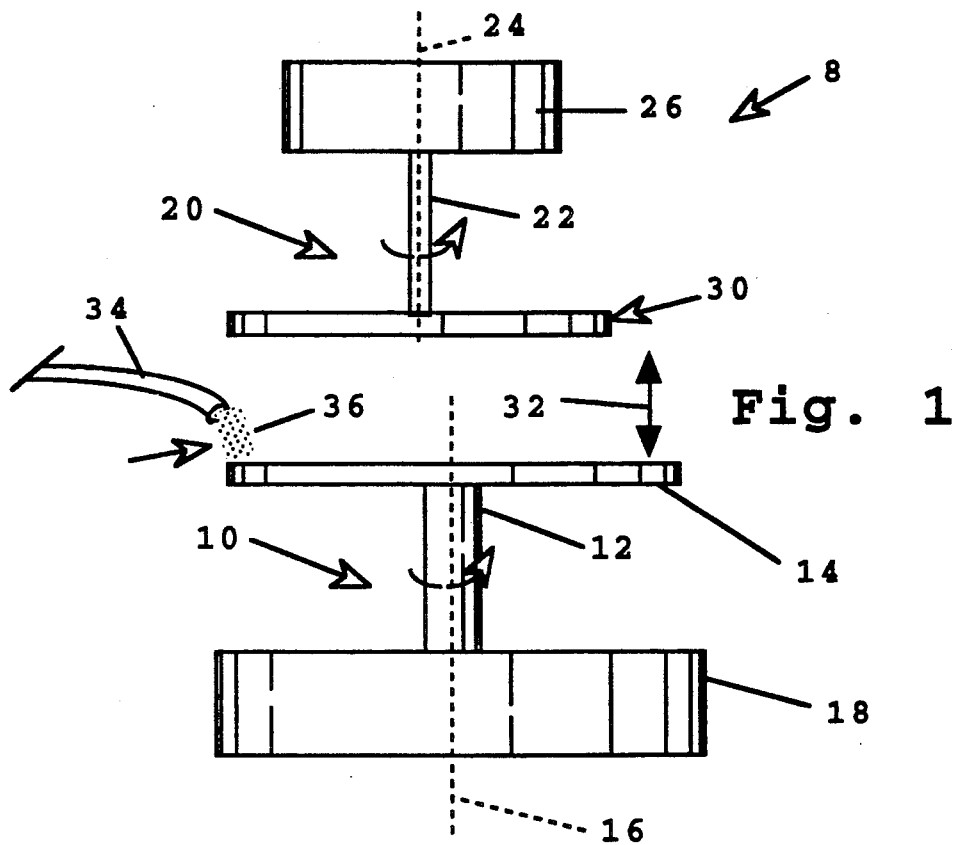
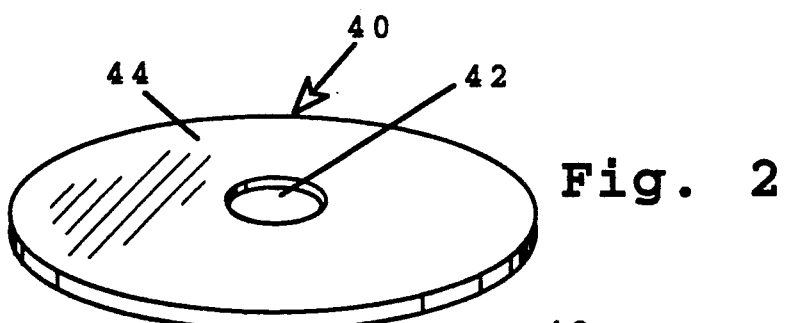
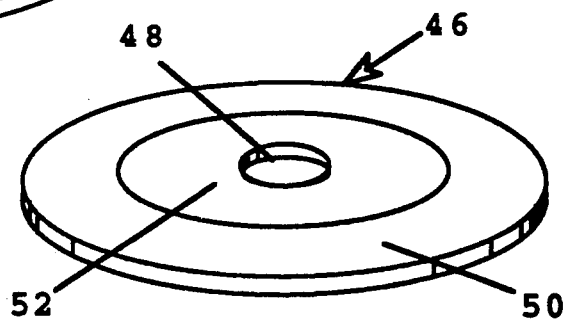

METHOD FOR TEXTURING A MAGNETIC DISC SUBSTRATE

FIELD OF THE INVENTION

The present invention relates to thin-film magnetic storage disc, and in particular, to a method and apparatus for texturing the surface of a disc substrate.

BACKGROUND OF THE INVENTION

Over the past several years, a significant increase in recording density in thin-film media magnetic recording discs has been achieved, and there is a continuing effort to increase recording density further.

A number of magnetic properties in a thin-film disc are important to achieving high recording density, including high coercivity and remanence, and low flying height. The latter property is important because as the read/write head is moved closer to the disc, there is less overlap of voltage signals in adjacent magnetic domains in the disc, with a corresponding increase in recording density.

Heretofore, discs having high coercivity and remanance characteristics have been prepared by sputtering a thin magnetic film on a metal substrate, typically an aluminum substrate. Prior to sputterinq, the substrate is plated with an alloy plating, such as a nickel/phosphorus plating to achieve a requisite surface hardness. The plated disc is then polished to remove surface nodules which form during the plating process.

The plated substrate is then textured by abrading or sanding, using a rotary abrasive pad placed off center with respect to the surface of the rotating substrate. The purpose of the texturing is to create a roughened surface characterized by submicron surface irregularities. The roughened surfaces reduces stiction, i.e., the static friction, between the disc and head by reducing surface contact between the two, particularly for start/stop cycles.

The sputtering operation used to produce the thin magnetic film is preferably carried out by first sputtering a chromium underlayer onto the substrate surface, then sputterinq a cobalt-based magnetic thin film over the underlayer. A protective, lubricating carbon overcoat is applied over the thin-film layer by sputtering.

Despite the favorable magnetic and surface-wear properties which can be achieved in the above described thin-film magnetic disc formed on a metal substrate, the recording density of the disc is limited in flying height by the irregularities on the disc surface (due to the surface texturing and surface irregularities related to the plating operation). The best flying head distances which have been achieved with metal substrate discs is about 6 μinches.

SUMMARY OF THE INVENTION

It is one general object of the invention to provide a method and apparatus for texturing a substrate to achieve both low-stiction properties and low-flying height in a magnetic recording disc formed on the substrate.

In one aspect, the invention includes an improved texturing pad for use with a conventional substrate texturing machine in which a texturing pad and substrate, both being rotated along parallel, offset axes, are brought into contact in the presence of a particle slurry. The pad includes an inner, relatively incompressible region which produces relatively deep texturing grooves in an annular region adjacent the inner edge of the disc, and an outer, relatively compressible outer region which produces relatively shallow texturing grooves over the outer annular portion of the substrate surface.

In one preferred embodiment, the inner and outer pad regions are separated by an annular spacing.

Also forming part of the invention is a method of texturing a metal substrate. The above pad and substrate, both rotating about parallel, offset axes, are brought into contact with one another in the presence of a particle slurry. During the period of contact, the less compressible inner region of the pad is effective to produce a deeper-groove texturing on an inner surface annulus of the substrate than is produced in the outer annular region of the substrate.

The ratio of pad rotation speed to disc rotation speed is preferably between about 1:10 to 1:30. The pad is preferably placed against the disc with a force of between about 5–30 lbs, and for a period of between about 15–60 seconds.

In yet another aspect, the invention includes a plated metal recording-disc substrate formed by the method of the invention, and a recording disc formed by sputtering an underlayer, magnetic thin film, and carbon overcoat on the substrate. The disc has a relatively lower coefficient of stiction on the inner annular region where start/stop cycles occur, and a relatively smoother outer surface region, allowing a lower flying height.

These and other objects and features of the invention will become more fully apparent when the following detailed description is read in conjunction with the accompanying drawings.

BRIEF DESCRIPTION OF THE DRAWINGS

FIG. 1 shows an apparatus incorporating the texturing pad of the present invention, for use in texturing an aluminum substrate;

FIG. 2 shows one embodiment of the texturing pad of the invention;

FIG. 3 shows another embodiment of the texturing pad of the invention;

DETAILED DESCRIPTION OF THE INVENTION

A. Substrate Texturing

Figure 4:
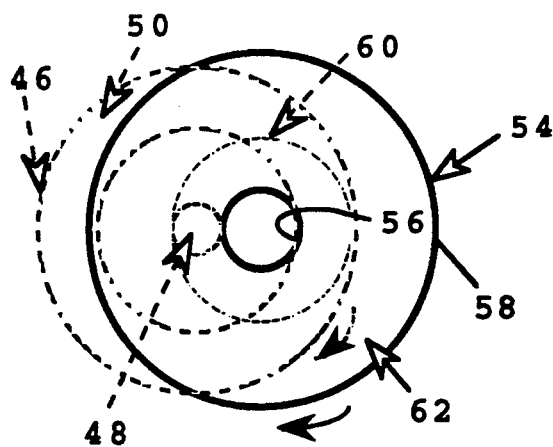
FIG. 4 shows the planar arrangment of a substrate (solid lines) and pad (dotted lines) in a texturing method.

FIG. 1 is a schematic view of an apparatus 8 designed for use in texturing the surface of a substrate, in accordance with the invention. A substrate assembly 10 in the apparatus includes a spindle 12 which rotates a substrate, such as substrate 14, about the spindle's central axis, indicated by dashed line 16. The spindle is driven by a motor 18 whose speed can be adjusted within the range of 50-400 rpm.

A pad assembly 20 in the apparatus includes a spindle 22 which is rotatable about an axis 24 which is parallel to and offset from axis 16. The relative offset of the two rotational axes can be adjusted. The spindle is driven, at a selected speed typically between about 1-50 rpm, by a motor 26 in the pad assembly. The texturing pad of the invention, indicated here at 30 is mounted on the spindle for rotation therewith. The pad will be described below.

The pad assembly is mounted for shifting toward and away from a texturing position at which the surface of the pad is brought into contact with the surface of the substrate, with a selected contact force. The shifting mechanism in the apparatus is indicated by arrow 32, and is also referred to herein as shifting means. As noted, the mechanism can be controlled to apply a desired force, typically about 5-20 lbs, between the pad and substrate surface.

Completing the description of what is shown in the figure, the apparatus includes a tube 34 for introducing a particle slurry 36 onto the surface of the disc (or pad), as the pad is brought into contact with the substrate. The tube is also referred to herein as means for introducing the slurry between the pad and substrate. The texturing apparatus or machine just described is commercially available, such as from Strausbough (San Jose, Calif.).

FIG. 2 shows a texturing pad 40 constructed according to one embodiment of the invention. The pad has an inner circular region 42 centered about the pad's axis of rotation, i.e., axis 24 in FIG. 1, and an annular outer region 44 which occupies the remainder of the pad surface. For texturing a substrate having an outer diameter of 3.5 inches, the pad has a diameter of 2-3 inches, preferably about 2.5 inches; the inner region has a typical diameter between 0.25 and 1.5 inches, preferably about 0.5 inches; and the outer region has a typical radial width of between about 0.25-1.25 inches preferably 0-5 inches. More generally, the inner and outer regions of the pad are dimensioned so that, when the rotating texturing pad is placed in contact with the rotating substrate in the above apparatus, the two regions are effective to texture inner and annular regions of the disc, as will be described below with reference to FIG. 4.

According to an important feature of the invention, the inner region of the pad is formed of a relatively incompressible material, such as polyurethane impregnated with polyester-based material, which is effective to produce relatively deep texturing grooves in the contacted region of the substrate, when the substrate and pad are brought into contact in the above apparatus in the presence of a particle slurry. Preferred inner-region material has a compressibility of between 15-17%, and a hardness of about 50-70 durometers. One suitable material used in forming the inner pad region is the surface material of a Suba-4 ™ texturing pad, available from Rodel (Scottsdale, Ariz.).

The outer region of the pad is formed of a relatively more compressible material, such as a softer polyester-based material, which is effective to produce a very shallow-groove, almost smooth texturing in the contacted region of the substrate, when the substrate and pad are brought into contact in the above apparatus in the presence of a particle slurry, as detailed below. Preferred pads have a compressibility of between 25-30%, and a hardness which is below the measurable hardness of rubber. One suitable material used in forming the outer pad region is the surface material of an Ultrapol ™ buffing pad, also available from Rodel.

The pad can be formed by replacing the outer region of a texturing pad of the type described above, with the softer surface material of a buffing pad surface of the type described above.

FIG. 3 shows a pad 46 constructed according to a second embodiment of the invention. This pad includes an inner circular region 48 constructed of a relatively incompressible material similar to that forming region 42 in pad 40, and an outer annular region 50 constructed of a more compressible material, such as that forming region 44 in pad 40. In this embodiment, the two regions are separated by an annular gap or spacing 52, which is has a radial dimension typically of about 0.5-1 inch. The gap region is surface-recessed so that it does not contact the substrate during a texturing operation.

To produce a textured substrate, in accordance with the invention, a substrate is mounted on spindle 12 in the texturing apparatus. The substrate is preferably an aluminum substrate, such as shown at 54 in FIG. 4 (solid lines), with standard-dimension inner and outer diameters. Two conventional-size substrates have outer diameters of 130 or 95 mm, with corresponding inner diameters of 40 and 35 mm, respectively. The inner and outer edges of the disc which define these diameters are indicated at 56, 58, respectively, in FIG. 4. The substrate is preferably first plated with a selected alloy plating, such as a nickel/phosphorus plating, to achieve a requisite surface hardness. The thickness of the plating is typically about 400-700 Å. The textured, plated substrate is then polished to remove surface nodules which form during the plating process, according to standard procedures.

With the above-described pad mounted on spindle 22 in the texturing apparatus, the speed of the substrate and pad are set between about 50-400 rpm and between about 5-50 rpm, respectively.

As the pad is moved into a position of contact with the substrate, a particle slurry is introduced onto the substrate or pad. The abrasion particles in the slurry are diamond fragments or $Al_2O_3$ particles having a mean particle size between 2 and 10 $\mu$, and preferably between 5-7 $\mu$. Suitable particles are diamond particles in a glycol slurry, such as supplied by Coral Chemicals (Paramount, Calif.).

During the texturing process, the texturing pad is brought into the contact position, and a constant contacting force of between 5-30 lbs, and preferably about 15 lbs, is maintained for a period of typically between 15 and 60 seconds. Throughout the period in which the disc and texturing pad are in contact, the pad and substrate rotation speeds are maintained at a preferred texturing pad:disc speed ratio of between 1:10 and 1:30.

FIG. 4 shows in plan view, the relative planar arrangement of the pad (dotted lines) and substrate (solid lines) during a texturing operation. The common direction of rotation in a clockwise direction in the figure is indicated by arrows. The pad shown here is the one illustrated at 46 in FIG. 3, having spaced inner and outer regions 48, 50, respectively. As seen the axial offset of the pad and substrate is such as to place the inner region of the pad with its outer edge tangential to the inner edge of the disc.

It can be appreciated that as the rotating pad is in contact with the rotating substrate, the inner region of pad sweeps out an inner annulus or annular region 60 bordering inner edge 56 on the substrate surface. This region therefore has a radial dimension roughly that of the inner region of the pad, i.e., about 0.25-1 inch, and preferably about 0.5 inches. The outer edge of the substrate annulus is indicated by phantom line in FIG. 4.

Similarly, as the rotating pad and substrate are brought into contact, the pad's outer region sweeps out an area which covers the entire substrate surface, and in particular, the outer annular region 62 of the substrate beyond annulus 60. It will be appreciated that because the outer region of the substrate moves faster relative to the pad than the inner region, the inner region of the substrate is exposed to a longer total period of texturing by the outer pad region.

The different hardness of compressibility of the inner and outer pad regions produce substantially different disc surface textures. The more compressible outer region does not force the slurry particles as deeply into the disc surface as does the less compressible inner region. This is due to the ability of the particles to become embedded in the more compressible pad, and thereby avoid contact with the disc surface, when the pad confronts the disc.

On the other hand, the hard inner region provides little resilience. The particles in between the disc surface and the inner region are driven into the disc, thereby etching a rougher texture over the surface. Thus, by combining the different regions into a single texturing pad, one texturing operation provides a disc surface with two distinct surface textures.

B. Surface Properties of the Textured Disc

Figure 5:
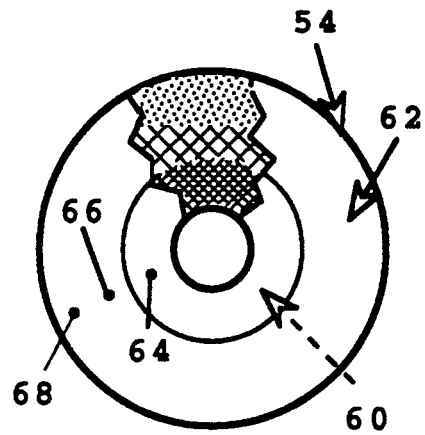
FIG. 5 is a planar view of a substrate formed in accordance with the invention, showing the differential texture groove depth in a radial direction in a surface portion of the disc.

FIG. 5 shows a planar view of a textured, plated substrate 54 formed in accordance with the invention. The surface texture features are indicated in an upper portion of the substrate by differential shading, where darker shading represents deeper-groove texturing, or greater roughness. As seen, the roughest texturing is in annulus 60. This inner region is dimensioned to correspond to the landing area where stop/start cycles occur on a recording medium. Outside of annulus 60, the texturing becomes substantially smoother, with increasing smoothness on progressing radially outwardly, as shown.

Figure 6A:
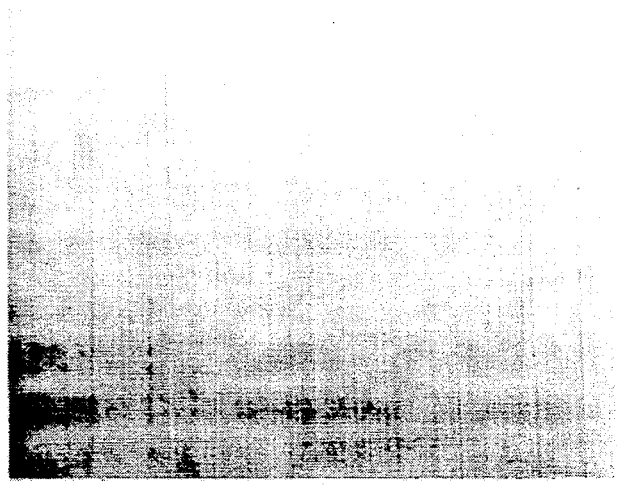
FIGS. 6A–6C, are micrographs of the surface textures of inner, intermediate, and outer regions of the surface of a substrate disc which have been textured in accordance with the invention.
Figure 6B:
Figure 6C:
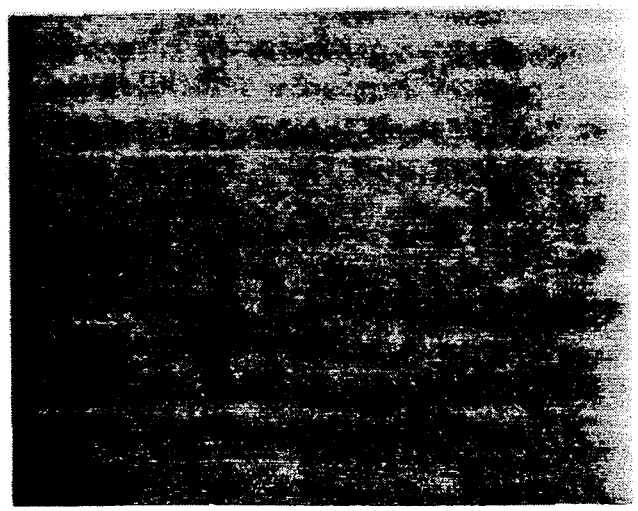

FIGS. 6A-6B are photomicrographs of the annulus region, and intermediate and outer edge surface regions of substrate 54, at surface regions corresponding roughly to the points 64, 66, 68, respectively in FIG. 5, at 92 magnification. The direction of rotation of the substrate surface regions shown in the figures is roughly in a top-to-bottom direction. In FIG. 6A, the inner annulus surface region of the disc is seen to have a weave pattern of crossing grooves which are oriented predominantly in the direction of radial motion motion of the substrate. The intermediate and outer surface regions seen in FIGS. 6B and 6C have a smoother surface appearance with no clear groove patterns.

The surface features of the textured substrate can be quantitated by standard interferometry methods in which the heights at many positions over the surface of the substrate is measured, and these coordinates are used to construct a three-dimensional topographic map of the surface. The interferometry measurements and calculations can be performed by commercially available interferometers, equipped with known microcomputer capability for calculating average surface roughness and maximum peak-to-valley distance, in a direction normal to the plane of the disc, over a given area, typically about 50 $\mu^2$. One interferometer which is suitable for this purpose is a Mirau Interferometer, Model Topo 3D, obtained from WYKO (Tucson, Ariz.).

Alternatively, the measurements may be taken with a contact profilometer. The profilometer consists of a stylus tip, typically diamond, which is dimensioned to follow the contour of the surface features of the disc. The stylus is slidably moved along a portion of the disc surface, usually over about a 1,000 $\mu$ interval, and the displacement of the stylus tip is recorded. One such device is available from Dektack.

Table I shows a comparison of the average roughness (A.R.) and maximum peak height of the features etched into the substrate surface, as determined by the above interferometry methods at the three surface regions indicated in FIG. 5. The substrate was prepared as described in Example 1.

TABLE I

| Region | A. R. (nm) | Max. Ht. (nm) |
|---|---|---|
| Outer | 2.5 | 8.5 |
| Middle | 3.0 | 10.5 |
| Inner | 4.8 | 17.0 |

The data demonstrate (a) the substantially greater surface roughness and groove depth (at least about 1.5 times greater) in the inner surface annulus, and (b) the slight roughness and groove-depth gradient in the region of the substrate beyond the inner annulus, progressing outwardly in a radial direction. It is noted that the texturing is confined to the upper surface region of the substrate plating, which itself is several hundred angstroms thick.

C. Thin-Film Textured Disc

Figure 7:
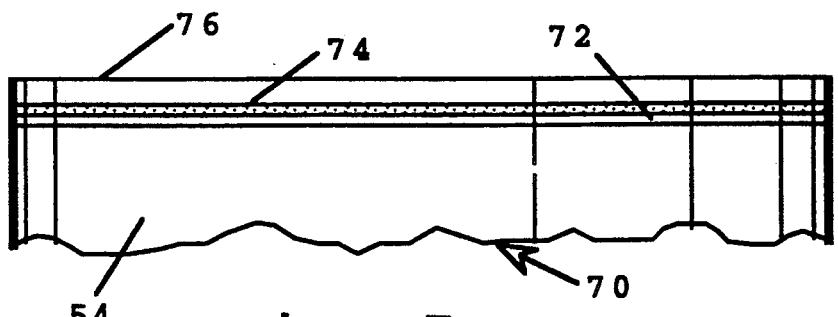
FIG. 7 shows a enlarged, fragmentary sectional view of a megnetic recording disc formed in accordance with the invention.

FIG. 7 shows an enlarged, fragmentary, cross-sectional view of a thin-film magnetic disc 70 formed on the above substrate 54, in accordance with the invention.

The three layers formed on the substrate include a chromium underlayer 72, a thin-film magnetic layer 74, and a carbon overcoat 76. These layers are preferably formed by sputtering, according to known methods, e.g., U.S. Pat. No. 4,816,127. Briefly, the substrate is placed in a conventional sputtering apparatus and the moved through a succession of sputtering chambers designed for sputtering onto the substrate (a) a chromium underlayer, to a thickness of about 1,000 to 4,000 Å, (b) a thin-film magnetic layer, to a thickness of about 300-1,500 Å, and a carbon overcoat. The thin-film layer is preferably a cobalt-based alloy containing, in one embodiment, 1-10% tantalum, 10-16% chromium, and 60-85% cobalt, and in another embodiment, 2-10% chromium, 20-28% nickel, and 70-88% cobalt.

Figure 8:
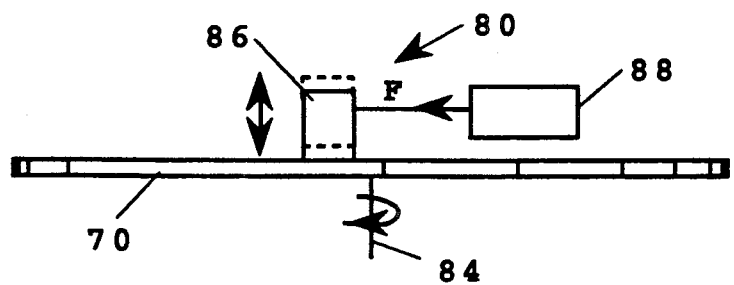
FIG. 8 shows, in schematic view, a device for measuring the stiction force of a disc surface.

The static surface coefficient of the disc can be measured by standard methods. FIG. 8 shows a schematic view of a device 80 used in measuring the static coefficient of friction of a carbon overcoat surface on a disc, such as a disc 70. The device used in this test is a standard drag test for measuring the static and dynamic coefficient of a disc, such as the Model No. UTS-777 machine supplied by New Phase Technology (San Jose, Calif.).

Briefly, the device includes a motor-driven rotor, indicated at 84, for rotating the disc at a low speed, typically about 1 rpm. A standard 10-gram composite read/write head 86 in the device is mounted for movement between positions of contact (solid lines) and noncontact (dotted lines) with the disc. This head, in turn, is coupled to a force transducer 88 which measures the force (in the direction of disc movement) applied to the head upon rotation of the disc from a stationary position.

Stiction measurements performed on discs whose plated aluminum substrate is formed by the method of the invention give characteristic coefficients of static friction in the range of 0.15–0.5 in the inner region of the disc surface corresponding to the inner annulus of the substrate. These coefficients are comparable with those of discs textured by prior art methods. The stiction coefficients of the remainder of the discs' surfaces are substantially greater than in the inner disc regions.

From the foregoing, it can be appreciated how various objects and features of the invention are met. The texturing method is readible adaptable to existing texturing machines, and requires no additional steps or processing time over conventional methods.

The disc produced using the substrate of the invention has low stiction in its inner, annular region, where the read/write head is normally parked, and where normal start/stop cycles occur, thus reducing wear and drag on both the disc and head with repeated start/stop cycles. At the same time, the outer surface region of the disc, which has a relatively high stiction coefficient, has "lower" surface irregularities, by virtue of the shallower texture grooves formed in the underlying substrate region, and this permits low flying heights, and thus higher recording densities over this recording portion of the disc.

The following examples illustrate methods for texturing a plated substrate, and forming a thin-film recording disc according to methods of the invention. The examples are intended to illustrate but not limit the scope of the invention.

EXAMPLE 1

Forming a Textured Substrate

A 3.5 inch aluminum substrate was plated with a nickel/phosphorous plating and polished according to conventional methods. The plating had a thickness of between about 400–600 Å.

A 2.5 inch diameter texturing pad was prepared with a 0.5 inch inner region having a hardness of about 60 durometers, and annular gap with an radial thickness of 0.5 inch, and an outer region with a radial dimension of 0.5 inch, and a compressibility of about 25–30%.

The substrate and pad were mounted in a commercial texturing machine, with substrate and pad rotational speeds of 125 and 8 rpms, respectively. A slurry containing 5–7 μ diamond particles was sprayed onto the substrate, and the pad was placed into contact with the the substrate with a 10 pound force, for a total period of 50 seconds.

Surface roughness and maximum peak-to-valley distances were measured by surface interferometry for inner, intermediate, and outer surface regions, with the results shown in Table 1 above.

EXAMPLE 2

Forming a Magnetic Recording Disc

The plated, textured substrate from Example 1 was sputtered under standard sputtering conditions to deposite on the substrate surface a 1,000 Å chromium layer 500 Å layer of a cobalt-based alloy containing 85% cobalt, 10% chromium, and 5% tantalum, and a carbon overcoat about 300 Å thick.

The coefficient of static friction, or stiction, was measured using a 10 g composite read/write head, as described above.

Although preferred embodiments of the invention have been described, it will be apparent to those skilled in the art that various changes and modifications may be made without departing from the invention.

It is claimed:

1. A method of texturing a magnetic disc substrate, having inner and outer edges, comprising the steps of:
   rotating the substrate at an angular velocity of between 50–400 rpm about a first axis; and
   placing the rotating substrate in contact with a texturing pad which rotates about an axis parallel to and offset from the first axis, and which has (a) an inner, relatively incompressible region, and (b) an outer, relatively compressible region, in the presence of a particle slurry between the rotating substrate and pad,
   by said placing, producing relatively deep textured grooves in an annulus adjacent the inner edge of the substrate surface which is contacted by said inner pad region, and relatively shallow textured grooves over the remaining, outer annular portion of the substrate surface which is contacted by said outer pad region.

2. The method of claim 1, wherein the pad has a diameter of about 2–3 inches, said inner region has a diameter of about 0.25–1.5 inches, and said outer region has a radial dimension of about 0.25–1.25 inches.

3. The method of claim 1, wherein the inner and outer regions are separated by an annular spacing having a radial dimension of between about 0.5–1.0 inches.

4. The method of claim 1, wherein said slurry contains abrasive particles having a size between about 2–10 μ.

5. The method of claim 1, wherein the substrate is an aluminum substrate.

6. The method of claim 1, wherein the ratio of pad rotation speed to substrate rotation speed is between 1:10 and 1:30.

7. The method of claim 6, wherein said inner and outer regions are placed in contact with the substrate for a period of between 15 and 60 seconds.

8. The method of claim 7, wherein said inner and outer regions are placed against the substrate with a force between about 5–30 lb.

* * * * *